No. 687,140. Patented Nov. 19, 1901.
A. R. EVEREST.
SYSTEM OF ELECTRICAL DISTRIBUTION.
(Application filed May 31, 1901.)
(No Model.)

Witnesses.
John Ellis Glenn.
Benjamin B. Hull.

Inventor.
Augustine R. Everest
by Albert S. Davis.
Atty.

UNITED STATES PATENT OFFICE.

AUGUSTINE R. EVEREST, OF LYNN, MASSACHUSETTS, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 687,140, dated November 19, 1901.

Application filed May 31, 1901. Serial No. 62,592. (No model.)

*To all whom it may concern:*

Be it known that I, AUGUSTINE R. EVEREST, a subject of the King of Great Britain, residing at Lynn, in the county of Essex and State of Massachusetts, have invented certain new and useful Improvements in Systems of Electrical Distribution, (Case No. 1,818,) of which the following is a specification.

My present invention relates to systems of electrical distribution or other circuits designed to operate with alternating currents, and comprises certain arrangements of apparatus in connection therewith whereby the voltage of the system or circuits may be automatically regulated in response to variation of load.

The principle of the invention may be explained roughly by stating that an electromotive force of substantially constant value is inserted by suitable means in series with one of the conductors or mains of the system. As the load on the system changes, this electromotive force is through shifting of phase of current in the system caused to be brought more or less into conjunction or opposition to the electromotive forces impressed upon the system, thereby either adding itself to or subtracting itself from this impressed voltage, and so securing the regulation desired.

The features of novelty involved in my invention I have particularly set forth in claims appended hereto.

For a better understanding of the invention itself, its construction, and mode of operation reference is to be had to the following detailed description, taken in connection with the accompanying drawings, in which—

Figure 1:
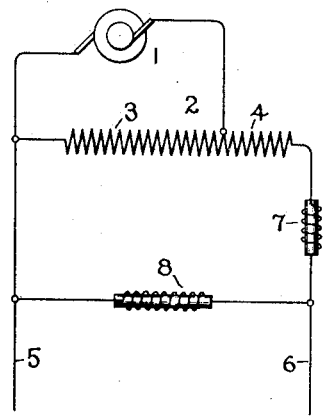
Figure 3:
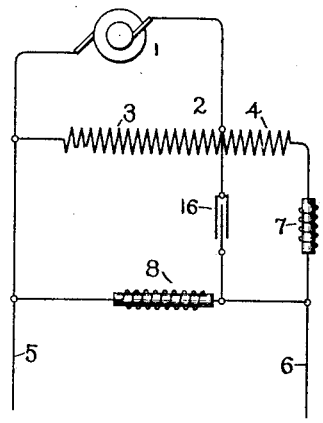
Figure 2:
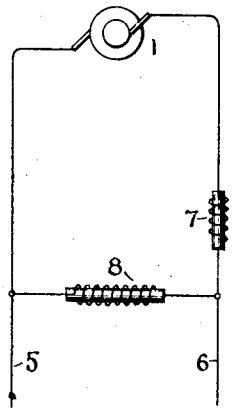

Figure 1 shows one embodiment of my invention; Fig. 2, a slightly-modified form; Fig. 3, still another modified form, and Fig. 4 an explanatory diagram.

Figure 4:
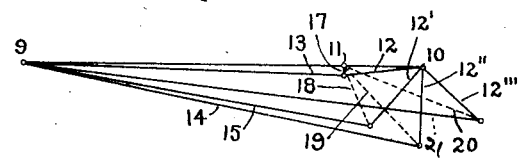

In Fig. 1 a main source of electromotive force is indicated conventionally at 1 and may consist of any suitable alternating-current dynamo-electric machine or other device for producing alternating currents. This source of current is shown as connected to a step-up compensator 2, the main winding of which is indicated at 3 and the boosting or secondary winding at 4. Transmission or distributing lines 5 and 6 extend from the outside terminals of the compensator 2, as shown, and serve to convey power to translating devices of any desired character—such, for example, as motors, lamps, or other energy-consuming devices. In series with one of these mains—as, for example, the main 6—I connect an inductance-coil 7 of special construction, the parts of the same being proportioned so that its core is saturated throughout the range of load on the distribution system. The reactive or inductive electromotive force due to this coil is therefore approximately the same whatever be the amount of current flowing through its windings. Shunted across the mains or conductors 5 6 is another inductance-coil 8, this coil being proportioned, however, so that its core remains unsaturated during normal operation. If there be no load on the mains 5 6, due to the connection thereto of translating devices, then it will be evident that the only current flowing through the inductance-coil 7 will be that supplied by the generator to the inductance-coil 8 in shunt across the mains. Since the inductance-coil 8 is highly inductive, the current flowing through the inductance-coil 7 will consequently lag nearly ninety degrees behind the electromotive force impressed upon the mains by the compensator 2. Since the reactive electromotive force due to the inductance-coil 7 lags ninety degrees behind the current flowing through the winding of this coil, it will therefore be evident that this reactive electromotive force will by the shifting of phase of the current due to the shunt inductance-coil 8 be brought nearly into exact opposition to the impressed electromotive force of the compensator 2. The parts are proportioned in a manner readily comprehended by one skilled in the art, so that the drop across the terminals of the inductance-coil 7 is substantially equal to the voltage of the booster 4. These two voltages therefore practically cancel each other, so that at no load the voltage on the mains 5 6 is practically the same as that between the terminals of the generator 1. This may perhaps be made clearer by reference to Fig. 4, in which the horizontal line 9 10 represents the total voltage of the compensator 2, that portion of the line between the points 10 and 11 representing the voltage of the booster 4, forming a part of the compensator. Since, as has been before explained, the current through the inductance-coil 7 is at no load nearly ninety degrees in phase behind the voltage 9 10 and since the reactive electromotive force of the inductance-coil 7 is lagged ninety degrees further, it will be seen that this reactive voltage is by this action shifted nearly one hundred and eighty degrees or into a position indicated by the line 12, drawn to represent the voltage across the terminals of the inductance-coil 7. The voltage on the mains 5 and 6 will obviously be the resultant of the voltage represented by the line 9 10 and that by the line 12, or, in other words, by the third side 13 of the triangle, of which the lines 9 10 and the line 12 constitute the other two sides. When the load on the mains 5 6 increases, the lagging current due to the shunt inductance-coil 8 forms a smaller and smaller proportion of the total load, due to which fact the lag of current in the mains 5 6 gradually decreases as full load is approached until when full load is reached the angle of lag of the total current is very much less than at no load. The effect of increasing load is therefore to decrease the angle of lag of the current, and therefore to shift correspondingly the phase of the reactive electromotive force of the series inductance-coil 7, this electromotive force by the operation mentioned being moved from a position in practical opposition to the impressed electromotive force through successive stages until it is brought into a position closely approaching an angle of ninety degrees to the impressed electromotive force. This is illustrated in Fig. 4, in which 12' and 12'' represent two succeeding angular positions of the reactive electromotive force of the inductance-coil 7. At 12'', which may be considered as corresponding to a position representing full load, the lag of current in the mains 5 6 is practically nothing, so that the electromotive force 12'' is nearly at right angles to the impressed electromotive force represented by the line 9 10. The resultant electromotive force on the mains 5 6 is, as will be evident, shown by the line 14, the length of which will from inspection be seen to be considerably greater than that between the points 9 11. In other words, the impressed voltage on the mains 5 6 rises with the load, as is necessary in such cases.

The line 12' represents an intermediate position between no load and full load, and the resultant 15 represents the corresponding voltage impressed on the mains 5 6, which, as will be seen, is somewhat greater than at low load and less than at full load.

In the description of Fig. 1, it is assumed that the generator 1 is adjusted so that its voltage is equal practically to the no-load voltage on the mains 5 6, the increased voltage at full and intermediate loads being obtained through the instrumentality of the booster 4. If, however, the main generator be worked normally at a voltage corresponding to full load, then the use of a booster becomes unnecessary, and the arrangement of circuits will be as indicated in Fig. 2. In this figure the inductance-coils 7 and 8 are the same as in Fig. 1, the voltage on the mains 5 6 being in this instance equal to the resultant electromotive force of the generator 1 and the inductance-coil 7, these electromotive forces combining in a manner already set forth in connection with Fig. 4, and therefore requiring no further description.

It will be seen that if the main current as the load comes on could be made to pass through successive stages of gradually-decreasing lag and then become actually leading with respect to the electromotive force the voltage of the inductance-coil 7, which when the current is lagging is always to a greater or less extent in opposition to the impressed electromotive force, would with leading current be actually added to the impressed electromotive force, thus securing an additional boosting effect due to phase advancement of the main current. This result may be secured in a variety of ways, one instance of which is indicated in Fig. 3. This figure corresponds in all respects with Fig. 1, with the exception that a condenser 16 is shunted across the outer terminals, respectively, of the booster 4 and the inductance-coil 7. By reference to Fig. 4 it will be seen that at no load practically no voltage exists across the terminals of the condenser 16, while with gradually-increasing load the voltage across the condenser increases correspondingly, this voltage being indicated by the successive dotted lines 17, 18, 19, and 20. As the load increases the condenser 16 will supply a larger and larger leading current, which passing around through the inductance-coil 7 reduces the lag of current therein and at full load may be caused to produce an actual leading of this current with respect to the impressed electromotive force of the compensator 2. The electromotive force across the terminals of the inductance-coil 7 may therefore be shifted into some such position as represented at 12''' in Fig. 4, thereby producing a voltage across the mains 5 6 actually greater than the maximum voltage across the outside terminals of the compensator 2. In Fig. 4 the line 21 represents this voltage and, as will be seen, is longer than the line 9 10, representing the voltage of the compensator.

Having thus described my invention, what I claim as new, and desire to secure by Letters Patent of the United States, is—

1. The combination of conductors, means for impressing thereon a substantially constant electromotive force, means for combining therewith a substantially constant regulating electromotive force, and means responsive to the load for shifting the phase of the last-mentioned electromotive force with respect to the first-mentioned electromotive force.

2. The combination of conductors, means for impressing thereon a substantially constant electromotive force, means connected in series with one of said conductors for producing a substantially constant electromotive force, and automatic means for shifting the phase of the last-mentioned electromotive force with respect to the first-mentioned electromotive force so that at small loads it will be in partial opposition thereto and at greater loads in partial conjunction therewith.

3. The combination of distributing or transmitting conductors, means for impressing thereon an electromotive force, an inductance-coil in series with one of said conductors, and another inductance-coil in shunt across said conductors.

4. The combination of a source of electromotive force of constant potential, distributing or transmitting conductors connecting thereto, an inductance-coil in series with one of said conductors, and another inductance-coil in shunt across said conductors.

5. The combination of a step-up compensator, mains extending from the terminals thereof, an inductance-coil in series with one of said mains, and another inductance-coil in shunt to said mains.

6. The combination of a step-up compensator, mains extending therefrom, an inductance-coil having a normally-saturated core in series with one of said mains, and another inductance-coil in shunt to said mains.

7. The combination of a winding constituting a source of electromotive force, mains extending therefrom, an inductance-coil in series with one of said mains, another inductance-coil in shunt to said mains, and a condenser connected between an intermediate point in said winding and one terminal of the series-connected inductance-coil.

In witness whereof I have hereunto set my hand this 25th day of May, 1901.

AUGUSTINE R. EVEREST.

Witnesses:
DUGALD McK. McKILLOP,
HENRY O. WESTENDARP.